Dec. 1, 1964    D. W. FAIR    3,159,232

SHEAR WAVE TRANSDUCER

Filed Nov. 14, 1962

INVENTOR.
DELBERT W. FAIR
BY
ATTORNEY

# United States Patent Office 3,159,232
Patented Dec. 1, 1964

3,159,232
SHEAR WAVE TRANSDUCER
Delbert W. Fair, Ponca City, Okla., assignor to Continental Oil Company, Ponca City, Okla., a corporation of Delaware
Filed Nov. 14, 1962, Ser. No. 237,524
8 Claims. (Cl. 181—.5)

The present invention relates generally to transducers for inducing a signal in an elastic medium and more particularly, but not by way of limitation, relates to a device for transmitting a horizontally directed, periodically reversing force to the earth in order to efficiently induce a seismic shear wave pulse of several seconds' duration and of controlled frequency content in the earth for seismographic surveying purposes.

Copending U.S. patent applications entitled "Method and Apparatus for Inducing Seismic Shear Waves in the Earth and for Seismic Surveying" and "Improved Seismic Transducer Construction," filed by Cherry et al. and Clynch et al., respectively, on the same date as the present application and assigned to the assignee of the present invention, describe the basic method and apparatus for seismographic surveying using a shear wave pulse of controlled frequency content. In general, the basic concept involves coupling a member to the earth and oscillating the member at a relatively rapid rate in a horizontal plane so that the forces will be transmitted to the earth and propagate in the form of seismic shear waves having particle motion normal to the direction of propagation. The basic apparatus or transducer for generating the seismic shear wave comprises a coupling plate member, a reaction mass member, a linear actuator for reciprocating the reaction mass in a horizontal plane relative to the coupling plate member, and means for applying a vertical static load on the coupling plate member to press the coupling plate member against the surface of the earth. Then when the reaction mass is reciprocated at a controlled frequency relative to the coupling plate member by the linear actuator, reaction forces opposite to the forces applied to the reaction mass member will be applied to the coupling plate and then to the earth so long as the coupling plate is securely connected to the soil of the earth. If the coupling plate does not remain solidly connected to the soil of the earth, very little seismic energy will be imparted to the earth. The present invention is concerned primarily with the problem of maintaining the coupling plate securely connected to the ground for the entire duration of the seismic signal.

It is particularly desirable to use the seismic shear wave transducers to practice the system of seismic surveying disclosed in U.S. Patent No. 2,688,124 issued to Doty et al. on August 31, 1954, and related patents. During normal field operations utilizing this system, a seismic transducer is transported by a truck to a desired location. The transducer is then lowered into contact with the surface of the earth and a static hold-down load applied to connect the coupling plate member to the earth. The transducer is then operated for several seconds to generate the "sweep" signal, stopped, raised from the ground by the truck, quickly moved forward several feet and lowered to the ground, then operated once again all within a total time period usually less than thirty seconds. It is necessary to operate at this fast rate because of the vast number of transmissions or "shots" required in order to collect the desired data and to operate more slowly would make the system somewhat impractical.

Therefore, it is evident that the coupling plate member must be quickly and easily connected to the surface of the earth merely by applying a static hold-down load. Further, the coupling plate member must be coupled to soils having widely varying compositions, hardness and textures, because it is not uncommon to couple the transducer to a paved or concrete roadway or to a plowed field. If the bottom surface of the coupling plate member in contact with the earth is essentially smooth, the frictional coupling with the earth will be broken after only a few cycles of reciprocation. Elongated, relatively slender spikes on the base plate, transversely disposed bars, transversely and vertically disposed plates, or small dense patterns of protrusions are little better because after a few vibrations the projecting devices tear and displace the soil so as to establish large holes or wallows in the soil and the coupling plate member is quickly reduced merely to frictional coupling once again. In these cases very little or no force or energy is transmitted into the soil to produce seismic waves. Another problem is the generation of vertical force components which generate pressure type seismic waves which tend to interfere with the horizontal waves. This can be caused either by a sloping surface in contact with the earth or rocking of the coupling plate member about a horizontal axis transverse to the line of reciprocation.

Therefore, an important object of the present invention is to provide a device for transmitting a horizontally directed, periodically reversing or reciprocating force to a body such as the earth so as to produce seismic shear waves of generally constant magnitude for a considerable period of time.

Another object of the present invention is to provide a device for connecting a transducer of the type described to the surface of the earth in such a manner that the transducer will remain connected to the earth while it is reciprocated in a plane parallel to the surface over a period of time, and will thereby induce a seismic shear wave in the earth.

Another object of the present invention is to provide a device of the type described which can be quickly and easily connected to the surface of the earth merely by applying a static hold-down load to the device.

Yet another object of the present invention is to provide a device of the type described which can be effectively coupled to a wide range of soils and surfaces.

A still further object of the present invention is to provide a device of the type described which can be provided in several different sizes each of which is better adapted for use on various types of soils and surfaces and which can be easily and quickly interchanged while operating in the field.

Another object of the present invention is to provide a device of the type described which will transmit only a horizontal force to the earth without generating any appreciable vertical force components.

Still another object of the present invention is to provide a device of the type described which will tend to prevent rocking of the device about a horizontal axis extending transverse to the direction of reciprocation and which will thereby reduce the generation of undesirable seismic pressure waves.

Many additional objects and advantages of the present invention will be evident to those skilled in the art from the following detailed description and drawings, wherein.

Figure 1:
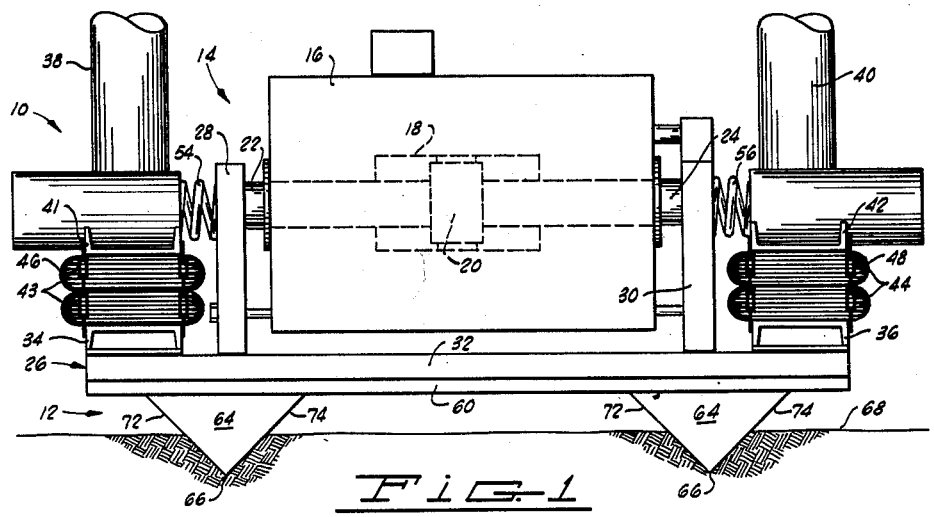
FIG. 1 is a side elevational view of a device constructed in accordance with the present invention.

Referring now to the drawings, a device for transmitting a horizontally directed, periodically reversing force to a surface of the earth is indicated generally by the reference numeral 10 and comprises the combination of a coupling member, designated generally by the reference numeral 12, and a means for reciprocating the member in a horizontal plane, designated generally by the reference numeral 14. The major portion of the means 14 may be substantially identical to the transducer construction described in the second referenced patent application and comprises, in general, a reaction mass member 16. A cylinder bore 18 is formed in the reaction mass member 16 and a double rod end piston member 20 is reciprocally disposed in the cylinder bore. The ends of the piston rods 22 and 24 are interconnected by a frame member, designated generally by the reference numeral 26, which is comprised of a pair of upright plates 28 and 30 which are connected to a horizontal plate 32.

A pair of inverted channels 34 and 36 are connected to each end of the upper face of the horizontal plate 32 for stiffening purposes. A vertical hold-down load is applied to each of the channels 34 and 36 by means of hydraulically actuated vertical posts 38 and 40, respectively, which are connected to transverse channels 41 and 42, which in turn act through pneumatic pillow bags 43 and 44. The pillow bags 43 and 44 provide a shock absorber means for isolating any vertical components of the horizontal plate 32 from the hydraulic mechanism carried by the transporting truck and connected to the vertical posts 38 and 40. The pneumatic pillow bags 43 and 44 also permit, to a limited extent, horizontal movement of the horizontal plate 32 relative to the vertical posts 38 and 40. A series of loosely strung chains 46 and 48 interconnect the transverse channels 41 and 42 and the inverted channels 34 and 36 to lift the horizontal plate 32 and therefore the entire reciprocating means 14, without placing the pillow bags 43 and 44 under tension. However, when the pillow bags are compressed, the chains 46 and 48 are loose to permit horizontal movement of the plate 32 relative to the vertical posts 38 and 40. Sets of springs 54 and 56 are disposed between the upright plates 28 and 30 and the transverse channels 41 and 42 to assist in maintaining the entire means 14 substantially centered between the vertical posts 38 and 40 during operation.

Figure 2:
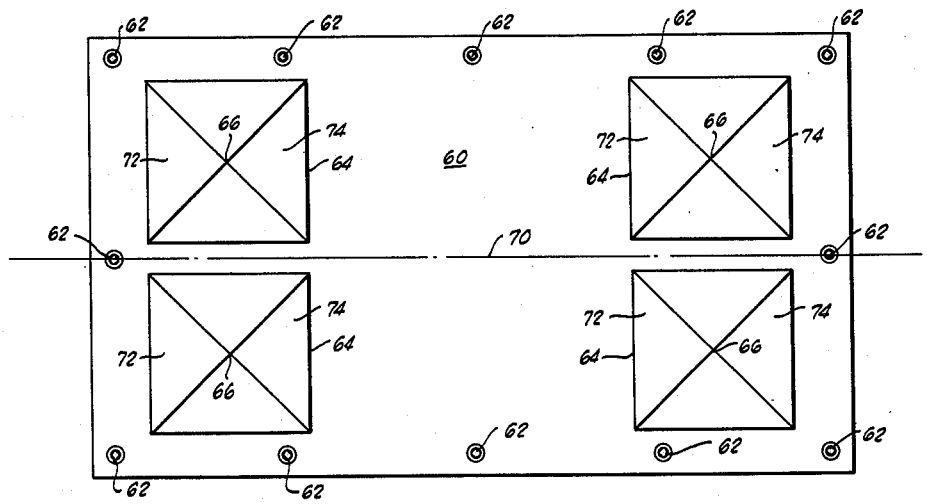
FIG. 2 is a bottom view of the device of FIG. 1.
Figure 3:
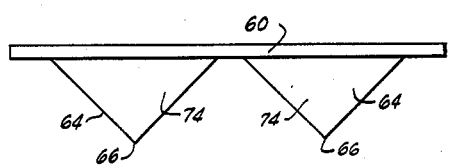
FIG. 3 is an end view of the lower portion of the device of FIG. 1.

The coupling member 12 desirably comprises a plate 60 which is removably connected to the plate 32 of the frame 26 by a plurality of countersunk Allen-head screws 62 disposed around the periphery of the plate 60. Four inverted pyramidal bodies 64 are connected to the bottom face of the plate 60 by any suitable means. As will be evident, the apexes 66 of the pyramidal bodies 64 point downwardly so as to engage the surface 68 of the earth first. As will presently be described, the periodically reversing forces which will be applied to the plate 60 and therefore transmitted to the pyramidal bodies 64 are applied parallel to the axis of reciprocation of the reaction mass member 16, the axis of reciprocation being indicated in FIG. 2 by the dotted center line 70. Thus it will be noted that two of the pyramidal bodies 64 are connected at one end of the plate 60 and are aligned transversely of the axis 70, while the other two pyramidal bodies 64 are disposed at the other end of the plate 60 and are also aligned transversely of the axis 70. Further, it will be noted that the horizontal cross sectional area, i.e., the area of each pyramidal body at the intersection of any horizontal plane, continually increases from the bottom (the apex 66) toward the top (the base of the pyramidal body connected to the plate 60), and consequently that the total horizontal cross sectional area of the device 12 continually increases from the bottom toward the top, with the exception of the horizontal plate 60 which, as will be hereafter described in greater detail, should never contact the surface 68 of the earth. It will also be noted that the faces 72 and 74 of the pyramidal bodies 64 are disposed generally normal to the direction at which the forces are to be applied to the earth and intersect at an angle to form the apex 66.

It should further be noted that the area of the pyramidal bodies 64, i.e., the vertical profile area of the faces 72 and 74, which is available to transmit horizontal forces to the earth in each direction increases substantially as the apexes 66 penetrate the earth. Similarly, it will be noted that the total horizontal cross sectional area of the device 12 which is in contact with the earth as the individual pyramidal bodies 64 are pressed into the soil continually increases. Finally, it should be noted that each of the pyramidal bodies 64 is essentially symmetrical about a vertical line when viewed in profile from the side, as in FIG. 1, so as to substantially eliminate vertical components of force as will presently be described.

In operation, the entire device 10 is lowered into engagement with the surface 68 of the earth by a suitable hydraulic mechanism connected to the vertical posts 38 and 40. By actuating the hydraulic mechanism in such a manner as to lower the device 10 further relative to the transporting truck, a substantial portion of the weight of the truck can be brought to bear on the vertical posts 38 and 40 and thereby apply a static hold-down load to the plate 32, and therefore to the coupling device 12, through the pneumatic pillow bags 43 and 44. The static load will press the pyramidal bodies 64 into the earth until the total area of the pyramidal bodies which is in contact with the soil is sufficient to support the weight of the device 10 plus that portion of the weight of the truck applied through the vertical posts 38 and 40.

Then hydraulic fluid is introduced to the cylinder 18 alternately on each side of the piston member 20 so as to reciprocate the reaction mass member 16 along the piston rods 22 and 24 at a frequency usually varying uniformly from 15–100 c.p.s. over a period of several seconds. Each time that the reaction mass member 16 is decelerated and then accelerated in the opposite direction, a reaction force will be transmitted through the frame member 26 to the plate 60 of the device 12. For example, assume for the moment that the reaction mass member 16 is moving from right to left, when referring to FIG. 1, and is decelerated to a stop, then accelerated from left to right. A horizontal reaction force will then be applied to the frame member 26 directed from right to left, still referring to FIG. 1, which will be transmitted to the plate 60 and then to the pyramidal bodies 64. The horizontally directed force will then be transmitted through the faces 72 of the several pyramidal bodies to the soil which may be in contact with the respective faces. As the reaction mass member 16 approaches the right hand end of its stroke, a horizontal reaction force directed from left to right will be transmitted to the pyramidal bodies 64.

At the beginning of reciprocation, the additional forces acting through the pyramidal bodies will further compact the soil and the faces 72 will further compress and displace a portion of the soil and move to the left. This means that the opposite faces 74 will tend to move away from the supporting soil previously in contact with these faces. However, this tends to reduce the total effective area of the four pyramids which is in contact with the ground so that the pyramidal bodies 64 will be forced deeper into the soil by the vertical static load of the reciprocating means 14 and the static load applied through the vertical posts 38 and 40. Therefore, as the pyramidal bodies 64 move to the left they also penetrate further into the soil such that the opposite faces 74 are maintained substantially in contact with the soil. Therefore, when the reaction mass member 16 reaches the other end of the stroke and is decelerated to a stop while travelling from left to right and accelerated back to the left, the reaction force applied from the frame member 26 through the coupling member 12 will almost instantly be applied through the faces 74 to the soil. During a three or four second pulse or period of operation of the device known in the art as a "sweep," the pyramidal bodies will continue to work into the soil, although the rate of penetration will be substantially reduced with depth. However, if the pyramidal bodies are properly sized for the particular soil, the coupling member 12 will never become disconnected or uncoupled from the soil and therefore will continually apply the periodically reversing, horizontally directed force to the earth so as to induce a continuous seismic shear wave signal of generally uniform magnitude in the earth. Another important advantage which results from maintaining the symmetrical pyramidal bodies 64 continuously in contact with the soil is that no net vertical force components are generated which would constitute compressional seismic waves tending to interfere with the desired shear waves. Although it might appear to those unskilled in the art that the sloping faces 72, for example, of the pyramidal bodies would tend to generate a compressional wave propagating at right angles from the faces when moved from right to left, it should be noted that at the same time the symmetrical faces 74 which are maintained in contact with the soil generate a decompressional wave of substantially equal and opposite magnitude so that no net pressure type wave is generated.

It will be noted that the quadrangular arrangement of the four pyramidal bodies 64 with pairs aligned transversely at opposite ends of the plate 60 provides a broad base which tends to prevent rocking of the device 10 about a horizontal axis disposed transversely of the axis 70. Any rotational motion or rocking about such an axis would result in vertical components of movement of the pyramidal bodies 64 and accordingly would produce pressure type seismic waves which would interfere with the shear type seismic waves which it is desired to generate by the device 10. Also, the points formed by the apexes 66 tend to act as self-levelers and thereby insure that the coupling member 12 will somewhat uniformly penetrate the soil.

The size and number of the pyramidal bodies 64 will vary somewhat according to the type of surface and soil to which the device 10 is to be coupled. In one typical embodiment, the pyramidal bodies 64 are one foot on a side at the base and one foot high from the base to the apex. However, it will be noted that the primary considerations are that the total maximum cross sectional area of the pyramidal bodies 64 must be sufficiently great to support the total vertical loads applied to the bodies as a result of the weight of the device 10 and the static load applied through the vertical posts 38 and 40, before the pyramidal bodies entirely penetrate the soil and the plate 60 contacts the surface 68 of the soil. Also, the profile area or vertical section of the pyramidal bodies 64 must be sufficiently great to transmit the horizontal forces to the earth without tearing the earth or otherwise displacing the soil to create cavities or "wallows" greater than can be filled by the taper of the pyramidal bodies. The relationship between the area of the faces 72 and 74 and the width of the base and the height of the apex should be such as to provide a sufficient surface area to transmit the horizontal forces to the soil at any depth to which the pyramidal bodies 64 may have penetrated the soil. It will also be noted that the taper of the pyramidal bodies 64 must be sufficiently great that the pyramidal bodies will have sufficient volume to occupy the space from which the soil is displaced by reciprocation of the reaction mass member 16.

It will be evident that different coupling members 12 having different sizes of pyramidal bodies 64 may be relatively quickly and easily changed in the field. For example, the device 10 may be set lightly upon a relatively hard surface so that the plate 60 will be held a substantial distance above the surface. A conventional Allen-head wrench may then be used to loosen the several screws 62 and thereby disconnect the plate 60 from the plate 32. The hydraulic mechanism can then be used to raise the means 14 from the coupling member 12 and then lower the means 14 onto a different sized coupling member 12. The Allen-head screws may then be easily tightened and the change will be completed. Thus during normal field operations, several coupling members 12 having various sizes of pyramidal bodies 64 may be transported by the vehicle. When moving from a soft plowed field to a relatively hard roadbed for example, a coupling member 12 having relatively large pyramidal bodies may be quickly and conveniently exchanged for a coupling member having a greater number of smaller pyramidal bodies 64. The smaller pyramidal bodies should still be spaced linearly along the axis 70 so as to reduce rocking of the device 10 about a transverse axis as previously described.

Having thus described a preferred embodiment of the present invention, it is to be understood that various changes, substitutions and alterations can be made therein without departing from the spirit and scope of the present invention as defined by the appended claims. In particular, it is to be understood that the precise shape of the bodies 64 may be varied to some extent without departing from the scope of the present invention as defined by the appended claims.

What is claimed is:

1. A device for transmitting a horizontally directed, periodically reversing force to the earth comprising, in combination:
   a coupling member having a horizontal cross sectional area which continually increases from the bottom toward the top for engaging the earth; and,
   means connected to the member for applying a force first in one direction and then in the opposite direction, the forces being applied in a horizontal plane.

2. A device for transmitting a horizontally directed, periodically reversing force to the earth comprising, in combination:
   a coupling member having a horizontal cross sectional area which continually increases from the bottom toward the top for engaging the earth;
   means connected to the member for applying a force first in one direction and then in the opposite direction, the forces being applied in a horizontal plane; and,
   means for applying a vertical load to the member while permitting free horizontal movement of the member.

3. A device for transmitting a horizontally directed, periodically reversing resultant force to the earth comprising the combination defined in claim 1 wherein the coupling member is further characterized in that:
   the maximum horizontal cross sectional area of the member is sufficiently great to support the total vertical load applied to the member in the soil to which the horizontally directed forces are to be applied.

4. A device for transmitting a horizontally directed, periodically reversing force to the earth comprising the combination defined in claim 1 wherein the coupling member is further characterized in that:
   the total vertical cross sectional area of the member normal to the direction of the horizontally applied forces is sufficiently great to transmit the horizontally directed forces to the earth without displacing a greater volume of the soil of the earth to which the force is to be applied than the volume of the member.

5. A device for transmitting a horizontally directed, periodically reversing force to the earth comprising the combination defined in claim 1 wherein the coupling member is comprised of:
   at least one body having a pair of oppositely facing, generally planing faces disposed generally normal to the direction of the horizontally applied forces, the faces intersecting at an angle to form a downwardly directed apex.

6. A device for transmitting a horizontally directed, periodically reversing force to the earth comprising the combination defined in claim 1 wherein the coupling member is comprised of:
   at least one body having the shape of an inverted pyramid, with two opposite sides of the pyramid being disposed generally normal to the direction of the horizontally applied forces.

7. A device for transmitting a horizontally directed, periodically reversing force to the earth comprising the combination defined in claim 1 wherein the coupling member is comprised of:
- a horizontal disposed plate having a longitudinal axis parallel to the directions of the horizontally directed, periodically reversing forces, four bodies each in the shape of an inverted pyramid connected to the underside of the plate, with the apexes directed downwardly, the four bodies being disposed in a quadrangular pattern with pairs of the bodies disposed adjacent each end of the plate and aligned transversely of the longitudinal axis thereof.

8. A device for transmitting a horizontally directed, periodically reversing force to the earth comprising the combination defiend in claim 1 wherein:
- the coupling member is substantially symmetrical about a vertical plane disposed normal to the direction of the horizontal force and passing through the center of each portion of the device engaging the earth.

No references cited.